(12) United States Patent
Skow

(10) Patent No.: US 7,102,669 B2
(45) Date of Patent: Sep. 5, 2006

(54) DIGITAL COLOR IMAGE PRE-PROCESSING

(75) Inventor: Michael Skow, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 248 days.

(21) Appl. No.: 10/115,176

(22) Filed: Apr. 2, 2002

(65) Prior Publication Data
US 2003/0184659 A1  Oct. 2, 2003

(51) Int. Cl.
H04N 5/228 (2006.01)
H04N 9/73 (2006.01)
H04N 5/217 (2006.01)
H04N 5/202 (2006.01)
H04N 5/335 (2006.01)
C06K 9/00 (2006.01)
C06K 9/40 (2006.01)

(52) U.S. Cl. ............... 348/222.1; 348/223.1; 348/241; 348/254; 348/273; 382/167; 382/254; 382/300; 358/516; 358/518

(58) Field of Classification Search ............... 348/221, 348/222, 223, 229, 241, 273, 280, 221.1, 348/222.1, 223.1, 229.1, 254
See application file for complete search history.

(56) References Cited

U.S. PATENT DOCUMENTS

| 4,959,727 | A | * | 9/1990 | Imaide et al. ............. 348/229.1 |
| 5,008,739 | A |   | 4/1991 | D'Luna |
| 5,262,849 | A |   | 11/1993 | Mimura |
| 5,343,243 | A |   | 8/1994 | Maeda |
| 5,404,165 | A | * | 4/1995 | Ohtsubo et al. ............. 348/254 |
| 5,901,257 | A |   | 5/1999 | Chen |
| 5,925,875 | A | * | 7/1999 | Frey ........................ 250/208.1 |
| 6,031,570 | A |   | 2/2000 | Yang |
| 6,035,077 | A |   | 3/2000 | Chen |
| 6,239,847 | B1 | * | 5/2001 | Deierling ............... 348/607 |
| 6,285,398 | B1 |   | 9/2001 | Shinsky |
| 6,791,609 | B1 | * | 9/2004 | Yamauchi et al. .......... 348/273 |
| 2001/0004268 | A1 | * | 6/2001 | Kubo et al. ............... 348/233 |
| 2001/0006400 | A1 |   | 7/2001 | Kubo |
| 2001/0012064 | A1 |   | 8/2001 | Kubo |
| 2001/0012399 | A1 |   | 8/2001 | Tohyama |
| 2001/0028397 | A1 |   | 10/2001 | Nakamura |
| 2002/0176009 | A1 | * | 11/2002 | Johnson et al. ............. 348/223 |
| 2005/0027912 | A1 | * | 2/2005 | Kondo et al. ................ 710/62 |

FOREIGN PATENT DOCUMENTS

EP  0 613 294 A1 *  2/1994

(Continued)

OTHER PUBLICATIONS

PCT International Search Report (PCT/US03/08760).

Primary Examiner—David Ometz
Assistant Examiner—Nhan Tran
(74) Attorney, Agent, or Firm—James L. Clingan, Jr.

(57) ABSTRACT

In one embodiment, the invention involves a method for processing an image. A sensor output is provided. An automatic gain control of the sensor output is performed to generate a first output. An automatic white balance correction to the first output is performed to generate a second output. A gamma correction of the second output is performed to generate a third output. A color interpolation is performed to the third output to generate a fourth output. A low-pass spatial filtration of the fourth output is performed to generate a fifth output. A color saturation and correction of the fifth output is performed to generate a sixth output, and a high-pass spatial filtration of the sixth output is performed to generate an image output.

9 Claims, 3 Drawing Sheets

FOREIGN PATENT DOCUMENTS

| | | | |
|---|---|---|---|
| EP | 0613294 | A1 | 8/1994 |
| EP | 0 762 742 | A2 * | 8/1996 |
| EP | 0762742 | A2 | 3/1997 |
| EP | 0 932 302 | A2 | 7/1999 |
| EP | 0940976 | A2 | 9/1999 |
| EP | 0969674 | A2 | 1/2000 |
| EP | 1022912 | A2 | 7/2000 |
| EP | 1 111 904 | A2 * | 12/2000 |
| EP | 1102209 | A2 | 5/2001 |
| EP | 1111904 | A2 | 6/2001 |
| EP | 1187455 | A2 | 3/2002 |
| WO | WO97/24880 | A1 | 7/1997 |
| WO | WO01/13649 | A1 | 2/2001 |

* cited by examiner

DIGITAL COLOR IMAGE PRE-PROCESSING

BACKGROUND OF THE INVENTION

1. Field of the Invention

The invention relates generally to the field of image processing. More particularly, the invention relates to digital color image processing.

2. Related Art

Imaging systems that are available on the market include still camera formats, such as advanced photo system (APS) and a variety of digital cameras, as well as video formats that include analog, digital, and mixed systems. Color image finishing of either format can be implemented by hard-wired analog or digital integrated circuits. Typically, the art relies on post-acquisition processing to adjust an image's color, tone, contrast, and other qualities. For example, users typically obtain an image, and post-acquisition, apply one or more corrections to that image using a commercially available software package. Since post-acquisition techniques may be used for these types of corrections, conventional imaging systems often do not employ sophisticated algorithms during acquisition. By not employing sophisticated algorithms, the cost and system processing time per picture of imaging systems can be minimized.

Although conventional imaging systems may advantageously keep certain costs low, those systems often yield images of relatively low quality, which forces end-users to rely upon post-acquisition software. The signal to noise ratio (SNR) of an image is an important consideration in photography, and many post-acquisition techniques, which attempt to properly expose, colorize and/or transform the image into a realizable output format, can unfortunately modify the SNR to the negative irreparably. This phenomenon is familiar to digital photographers who begin to see digital artifacts in an image after several correction routines are applied sequentially. Thus, a need exists for methodology that could produce high-quality images while, at the same time, decreasing the need for post-acquisition processing.

Any problems or shortcomings enumerated in the foregoing are not intended to be exhaustive but rather are among many that tend to impair the effectiveness of previously known digital imaging and processing techniques. Other noteworthy problems may also exist; however, those presented above should be sufficient to demonstrate that apparatus and methods appearing in the art have not been altogether satisfactory and that a need exists for the techniques disclosed herein.

SUMMARY OF THE INVENTION

Embodiments of the present disclosure address shortcomings mentioned above by providing new techniques for digital color image pre-processing of an image, both still and video.

In one embodiment, the invention involves a method for processing an image. A sensor output is provided. An automatic gain control of the sensor output is performed to generate a first output. An automatic white balance correction to the first output is performed to generate a second output. A gamma correction of the second output is performed to generate a third output. A color interpolation is performed to the third output to generate a fourth output. A low-pass spatial filtration of the fourth output is performed to generate a fifth output. A color saturation and correction of the fifth output is performed to generate a sixth output, and a high-pass spatial filtration of the sixth output is performed to generate an image output.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. It should be noted that the features illustrated in the drawings are not necessarily drawn to scale.

DESCRIPTION OF ILLUSTRATIVE EMBODIMENTS

Figure 1:
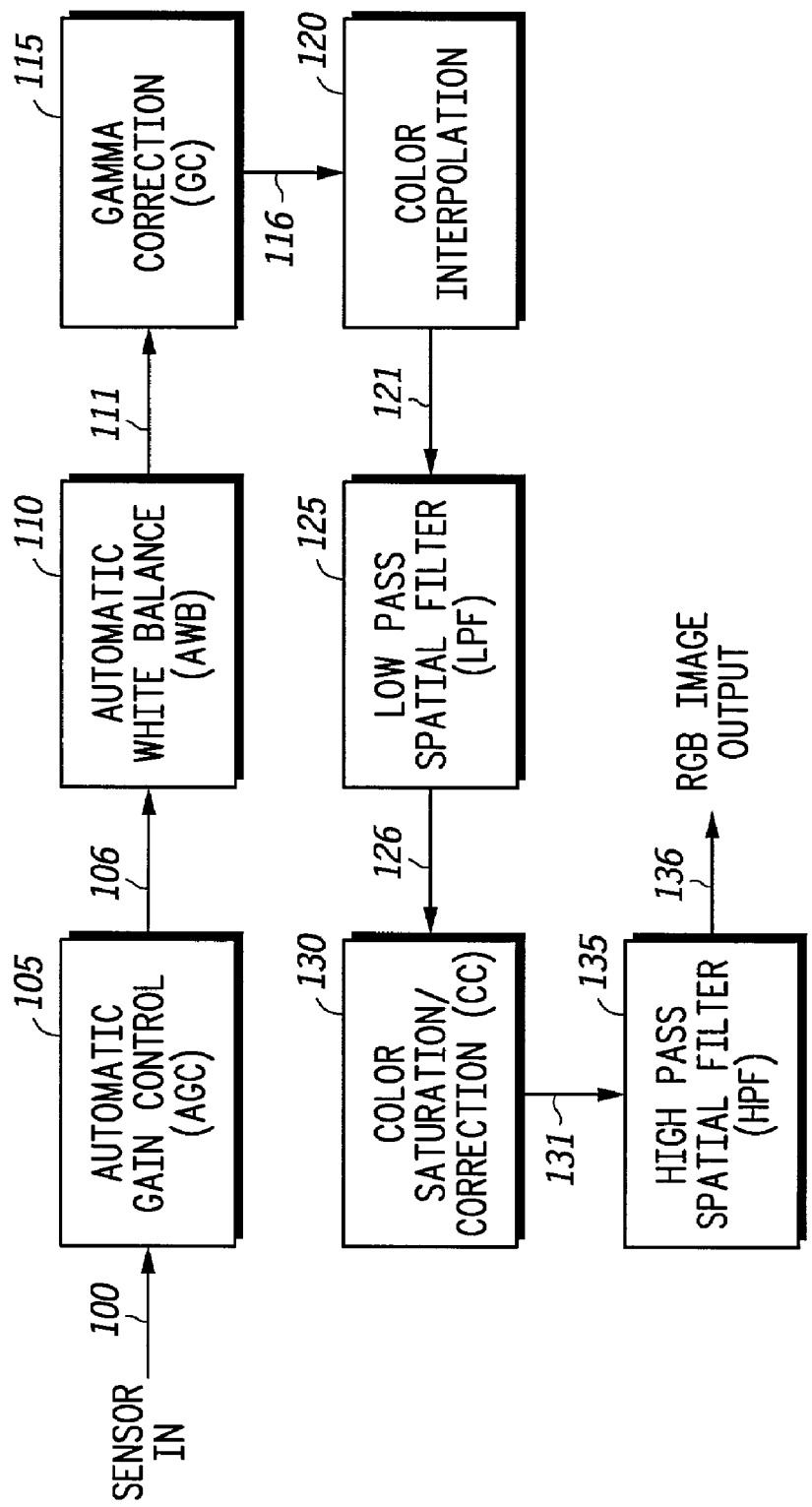
FIG. 1 shows a flow diagram according to an embodiment of the invention.

The invention and its various features and advantageous details are explained with reference to non-limiting embodiments and the accompanying drawings.

Embodiments of the present disclosure address shortcomings in the state of the art of digital imaging, such as those mentioned above, by providing methodology whereby effective digital color pre-processing is achieved prior to outputting a digital image. In particular, embodiments described herein show how color adjustments may be applied within a device itself, for example, image adjustments may be applied on a CMOS sensor chip or with a CCD sensor chip to achieve proper color balance.

Applications for the present disclosure are vast and include any application in which digital imaging and/or processing is involved. Embodiments may be applied to digital still and/or digital video cameras. Techniques of this disclosure are particularly well-suited for color pre-processing on a Bayer Pattern digital image, although those having skill in the art will recognize that different CFA architectures may be used as well. Embodiments may be applied to digital imaging adapted for use not only in personal photography and videography, but also in medical, astronomy, physics, military, and engineering applications. Embodiments may be applied to devices utilizing one or any number of digital sensors.

Embodiments of this disclosure may be utilized in conjunction with a wide range of imaging system, including systems that use a complementary metal oxide semiconductor (CMOS) sensor having independent gain amplifiers for each of a set of four Bayer color levels. Embodiments may be utilized in conjunction with CCD sensors as well. Embodiments may also be utilized when an imaging system includes a digital processor that can provide gains to each color. Embodiments may be utilized via one or more computer programs, with an application specific integrated circuit (ASIC), or the like, as will be understood by those having skill in the art.

Embodiments of the present disclosure involve a finishing system that pre-processes images in combination with updating sensor outputs by feeding back adjusted images. Such methodology may greatly increase image resolution and quality as well as reduce or eliminate post acquisition processing time and the necessity for complex post acquisition hardware and software.

While current systems emphasize the minimization of capture time and the maximization of user control of post-acquisition processing steps, embodiments of the present disclosure reduce overall processing time by automating certain image processing algorithms, which are used to update a sensor's output. This reduces, or eliminates the need for post-acquisition adjustments. Finishing systems of this disclosure can be used in conjunction with different types of hardware, and are capable of displaying still images captured on film, supporting a digital video application, assisting in a system calibration and generating imaging statistics.

Image processing may include several processing algorithms in combination or in isolation. Such algorithms may include, but are not limited to, automatic exposure control, automatic gain control, gamma correction, white balance correction, color correction, color saturation, and color interpolation. A description of specific embodiments of these algorithms are discussed below.

One embodiment of this disclosure may provide a method and/or apparatus for automatic exposure and gain control (AEC/AGC). In one embodiment, an AEC/AGC algorithm may optimize the output level of a captured image. The optimal level of the algorithm may be a programmable value to the integration time for the sensor and/or to a gain amplifier with a programmable multiplicative range. In one embodiment, however, the optimal level may be set as the midpoint of a potential dynamic range, which can be specified as 128 DN. The algorithm may be disabled by a host processor at any time. When operational, AEC/AGC algorithms can program an integration time (exposure) and analog global gain registers of a sensor with values predicted by the algorithm.

In one embodiment, an AEC/AGC algorithm can converge on the optimal exposure and integration point within 10 frame times. The algorithm may operate continuously when enabled. Built-in hysteresis may allow the algorithm to stabilize on a near optimal value even as minor elements of a scene vary from frame to frame.

In one embodiment, an AEC/AGC algorithm may calculate a mean value of a bottom half (or another region) of a captured image or an entire captured image, as commanded by the host processor. Based on a zoom ratio selected by the host processor, a window of interest (WOI) of the sensor will vary and therefore so will the size of the image used to calculate the median value of the image. The luminance value (Y value only of the converted YCC 4:2:2 internal data stream) may be used for calculation of the median image value. The median value of the image may be compared to an optimal (programmable) target level. An increase or decrease to the current exposure and gain level can be predicted. An amount increased (or decreased) may be accumulated based on a scale from a programmable lookup table. This method in closed-loop function may progressively approach the optimal value for exposure/gain of the system.

An AEC algorithm may measure a distance of the mean value of the image to a programmable target value. In one embodiment, the target value is 128DN by default, but may be programmed by the host processor. The AEC algorithm can increase or decrease the exposure by a fixed amount in order to drive the image towards the target value. The amount of the increase or decrease can be programmable, with a default being 16DN (to eliminate the need for programming the lower nibble of the exposure command word on the sensor). Once an AEC algorithm has determined that the distance between the scene mean average and the target value are within some small fixed value, the algorithm may cease updating the exposure until a scene data changes to drive the mean from outside of that bound. The bound of the distance between the scene mean average and target value can be programmable, with a default value of +/−12 DN (about 10% of a dynamic range).

An AEC algorithm may also optimize image signal-to-noise ratio (SNR) by increasing the integration time (exposure) to a maximum before increasing a gain beyond minimal levels. In the event the gain is larger than minimum (when decreasing the image exposure), the gain can be reduced to a minimum before the integration time (exposure) is reduced from a maximum. AEC algorithms may be disabled at any time. In one embodiment, an algorithm can be disabled in favor of direct control from the host processor when used in a verifier application.

In one embodiment, an AEC/AGC algorithm may be performed with the sensor operating in continuous frame capture mode. The default values for the system may be to use the median dynamic range number (128 DN) as the target. One byte can be used to write the variable median value as needed. The default of the algorithm may be enabled, with a single bit reserved to enable or disable a function. A default lookup table can be loaded with a linear response curve, increasing the response of exposure and gain as the value is farther away from the median. Typically, the table may require a minimum of 8 steps, each with a register for gain and exposure increase and decrease (16 total registers).

The invention can also provide a method and/or apparatus for an automatic white balance (AWB). An AWB function can gather statistics on incoming pixel values to determine the appropriate gain settings on each gain channel to achieve white balance. When an AWB mode is enabled, values for the predicted illuminant level (from a programmable lookup table) can be loaded into the sensor. Sensor analog signal processing chain color gains can be used to perform the actual white balance function.

In one embodiment, a gray world model algorithm may be used in which a system assumes that each chroma ($C_r$ & $C_b$) channel mean average should be near the mid-range for that channel. The mid-range value is typically 128DN (on an 8-bit scale), and can be programmable via a host processor integrated circuit interface, such as an $I^2C$ bus. The average $C_r$ chroma channel can be used for calculation purposes, and compared to an assumed gray level. The entire captured image, or the bottom half of the captured image (or another region) may be used in calculation of the average chroma level. The selection of image area to be considered can be made via a host processor $I^2C$ command.

In one embodiment, as in the AEC/AGC algorithm, an AWB algorithm can perform the average calculations on a per frame basis and have a variable step size to the gain values to facilitate a setting time of less than 10 frames. Once a goal has been achieved, gain settings do not need to be adjusted again unless the average differs from the goal by a programmable value, creating a hysteresis in the AWB algorithm.

In one embodiment, in addition to the gray world model for statistics, a yellow illuminate model can be applied to color channel gain setting choices. That is, the illuminate in any given scene is assumed to be on a yellow to white spectrum curve. This allows the algorithm to ignore non-natural illuminates and therefore provides a simplified solution. Actual color ratios (color gain register values) for each different illuminant are programmable, so differences in a color filter array (CFA) pattern or optical filters may be accounted for after a system hardware design. According to different embodiments, the number of predetermined illuminant levels may be variable. In some embodiments, the number may be kept small to maintain efficiency within the hardware. The number of illuminant levels, however, should be enough to differentiate between illuminant types (e.g., sunlight, fluorescent light, incandescent light, etc) without significant error. A nominal number of illuminant types may be approximately 8. Algorithms may be used with the sensor in video or still image output modes.

In one embodiment, an AWB algorithm can be disabled during image capture for an application. At any time, the AWB algorithm may be disabled, and programmable color registers can be programmed directly from a host processor. Values for this direct programming can be calculated during system calibration. Sensor analog signal processing (ASP) electronics can be used for gain. Provision may be made to have the color gain register addresses programmable.

In one embodiment, a default value for the AWB function can be enabled. A single programmable bit can enable and disable a function. A series of 8 illumination levels, 4 colors (1 byte per color) can be used to define a lookup table. Thirty-two total bytes may be used for the lookup table. The default of the table can be a linear yellow illuminant, where the proportion of blue and green increase in a linear manner from white (no gain) to a blue gain being a maximum. A default image segment or window can be a bottom half (southern half) of an image for statistics purposes, although it will be understood that any other region of the image (or the image as a whole) may be used.

Embodiments of the present disclosure can also provide a method and/or apparatus for color interpolation algorithms. In one embodiment, the color interpolation algorithm can be performed on an incoming RGB or CMY Bayer data from a sensor. The color interpolation algorithm may be performed regardless of color filter array type used. In one embodiment, an input is a 10 bit-per-pixel data, and an output is 24 bit (8 bits per color plane) data.

In one embodiment, the color interpolation algorithm can be similar, in at least certain respects, to a 3×3 bilinear interpolation. Elements can be added to assist in image edge enhancement by detecting horizontal and vertical gradients and shifting an interpolation kernel to minimize image smear across those gradients. A host processor input can include a zoom (and thus input image) size, and a starting Bayer color position. The ability to change Bayer color starting position may allow individual pixel variation of the window of interest (WOI). Two lines of storage can be used to perform a color interpolation operation. A host processor command can be allowed to bypass the interpolation block in the event the image sensor is monochrome.

Embodiments of this disclosure can also provide a method and/or apparatus for color correction algorithms. In one embodiment, a three-by-three color correction algorithm can perform a per pixel operation matrix multiplication. The function of the algorithm includes correcting for color crosstalk and other system optical functions, as well as saturate the colors. The color correction algorithm can utilize the following equations:

$$R_{OUT}=(R_{IN} \times R_R)+(G_{IN} \times R_G)+(B_{IN} \times R_B)+R_{offset}$$

$$G_{OUT}=(R_{IN} \times G_R)+(G_{IN} \times G_G)+(B_{IN} \times G_B)+G_{offset}$$

$$B_{OUT}=(R_{IN} \times B_R)+(G_{IN} \times B_G)+(B_{IN} \times B_B)+B_{offset}$$

In one embodiment, the bandwidth of the color correction may be of at least 13 Mpixels per second. Inputs ($RGB_{IN}$) and outputs ($RGB_{OUT}$) can both be 24-bit (8-bits per color) operations.

Embodiments of this disclosure can provide a method and/or apparatus for gamma correction algorithms. In one embodiment, a gamma correction of an image is performed via 4 fixed look-up tables (LUTs), or palettes. One of the LUTs can be selected by a host processor via an $I_2C$ command. The LUTs may perform gamma correction in RGB space, and operate on each color plane independently. A gamma correction algorithm operation can be per-pixel.

In one embodiment, the 3 fixed LUTs may have the function of: $R_{out}=R_{in}^{pwr}$; $G_{out}=G_{in}^{pwr}$; $B_{out}=B_{in}^{pwr}$, wherein the values of pwr can selectable by the host processor according to Table I.

TABLE I

| Selection | Pwr | Function | Gamma |
|---|---|---|---|
| 1 | 1.0 | linear | 1.0 |
| 2 | 0.85 | high contrast | 1.176 |
| 3 | 0.7 | low contrast | 1.428 |
| 4 | 0.45 | NTSC, TV | 2.2 |

In one embodiment, the bandwidth of the gamma correction may be of at least 13 Mpixels per second. The input to and output from the gamma correction algorithm can be color corrected RGB 24 bit (8 bits per pixel) data. A default gamma correction can be selection 2, high contrast.

FIG. 1 shows a block diagram of a camera flow according to embodiments of the present disclosure. A sensor signal 100, which can be a raw Bayer sensor signal, is coupled to an automatic gain control block 105. The automatic gain control block 105 is coupled to an automatic white balance block 110 via an automatic gain control signal 106. The automatic white balance block 110 is coupled to a gamma correction block 115 via an automatic white balance signal 111. The gamma correction block 115 is coupled to a color interpolation block 120 via a gamma correction signal 116. The color interpolation block 120 is coupled to a low-pass spatial filter 125 via a color interpolation signal 121. The low-pass spatial filter 125 is coupled to a color saturation and correction block 130 via a low-pass spatial filter signal 126. The color saturation and correction block 130 is coupled to a high-pass spatial filter block 135 via a color saturation and correction signal 131. An RGB image output signal 136 is coupled to the high-pass spatial filter block 135.

Still referring to FIG. 1, the automatic gain control block 105 can perform an expansion of a histogram to fill a dynamic range, applying to it a gain in a digital domain. The automatic white balance block 110 may calculate a gray world model ratio of the colors in a Bayer (or other CFA) pattern, applying a constant multiplier to each color. The gamma correction block 115 can perform a variable gamma correction to increase a perceived dynamic range of an image included in the automatic white balance signal 111 (shadow detail), causing a spatial noise increase. The color interpolation block 120 can perform a three-by-three edge enhance demosaic of the gamma correction signal (raw Bayer) to an RGB (24 bit color) image. The color interpolation block 120 can include edge enhancement algorithms.

Still referring to FIG. 1, the low-pass spatial filter block 125 can perform a low pass filter on three color planes, eliminating a fixed pattern noise (FPN) in a flat field before a saturation process. The color saturation and correction block 130 can perform a color saturation function by manipulating color ratios of three color planes within each pixel, causing a spatial noise increase. The high-pass spatial filter block 135 can provide enhancements in spatial edges of an image included in the color saturation an correction signal 131, which may have been smoothed by a combination of previous processes.

Still referring to FIG. 1, the gamma correction block 115 can include a gamma correction algorithm which may be performed in gray space, reducing noise. The low-pass spatial filter block 125 can include a low-pass filter function that is performed before a color correction algorithm and can decrease a noise increase effect of the color correction algorithm.

Figure 2:
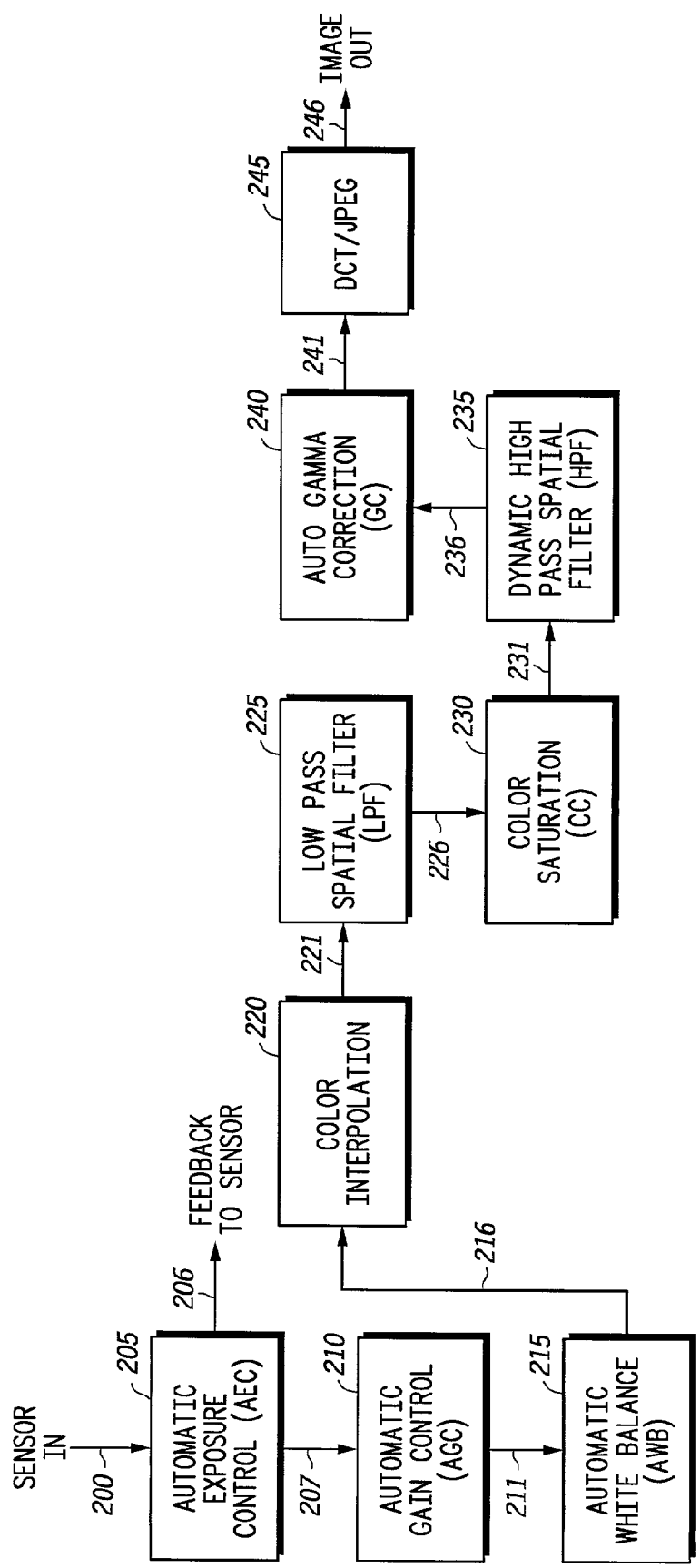
FIG. 2 shows a flow diagram of digital color image pre-processing according to an embodiment of the invention.

FIG. 2 shows a block diagram of a digital color image pre-processing method according to embodiments of the present disclosure. A sensor signal 200 is coupled to an automatic exposure control block 205. The automatic exposure control block 205 is coupled to a sensor via a feedback signal 206, and it is coupled to an automatic gain block 210 via an automatic exposure control signal 207. The automatic gain bock 210 is coupled to an automatic white balance block 215 via an automatic gain control signal 211. The automatic white balance block 215 is coupled to a color interpolation block 220 via an automatic white balance signal 216. The color interpolation block 220 is coupled to a low-pass spatial filter block 225 via a color interpolation signal 221.

Still referring to FIG. 2, the low-pass spatial filter block 225 is coupled to a color saturation block 230 via a low-pass spatial filter signal 226. The color saturation block 230 is coupled to a dynamic high-pass spatial filter block 235 via a color saturation signal 231. The high-pass dynamic spatial filter block 235 is coupled to an auto gamma correction block 240 via a high-pass dynamic spatial filter signal 236. The auto gamma correction block 240 is coupled to a discrete cosine transform and JPEG (joint photographic-coding expert group) block 245 via an auto gamma correction signal 241. An image out signal 246 is coupled to the discrete cosine transform and JPEG block 245.

Still referring to FIG. 2, the sensor signal 200 can be a raw Bayer sensor signal. The automatic exposure control block 205 can perform a continuous monitoring of the sensor signal 200 at a frame rate. The automatic exposure control block 205 can also output a feedback signal 206 to a sensor, such that the block is in a closed loop feedback with the sensor prior to capture. The automatic gain control block 210 can stretch a histogram to an available dynamic range of a digital system, and a digital domain gain can be based on a median model. The automatic white balance block 215 can perform a gray world model analysis and linear gain of various color planes based on that model.

Still referring to FIG. 2, the color interpolation block 220 can perform a three-by-three edge enhanced demosaic of a raw Bayer image to an RGB (24-bit color) image. The low-pass spatial filter block 225 can perform a low-pass filter on three color planes, eliminating fixed pattern noise in a flat field before saturation, causing a spatial noise decrease. The color saturation block 230 can manipulate color ratios of three color planes within each pixel, causing a spatial noise increase. The low-pass spatial filter block 225 may be located before the color saturation block 230 to mitigate noise, which may be due to color intensity differences. The dynamic high-pass spatial filter block 235 can enhance spatial edges of an image included in the color saturation signal 231, which may have been smoothed by a combination of previous processes.

Still referring to FIG. 2, the gamma correction block 240 can perform a variable gamma correction algorithm increasing a perceived dynamic range of an image. A gamma level can be automatically selected based on scene illumination data, wherein a gamma value is inversely proportional to a luminance value. The auto gamma correction block 240 can use the scene illumination data to detect an expected amount of signal-to-noise ratio available before application of a fixed gamma table. The discrete cosine transform and JPEG block 245 can perform a JPEG compression of an image. The image out signal 246 can be in a JPEG format, although those having skill in the art will recognize that other output file formats such as TIFF and the like may be utilized.

Figure 3:
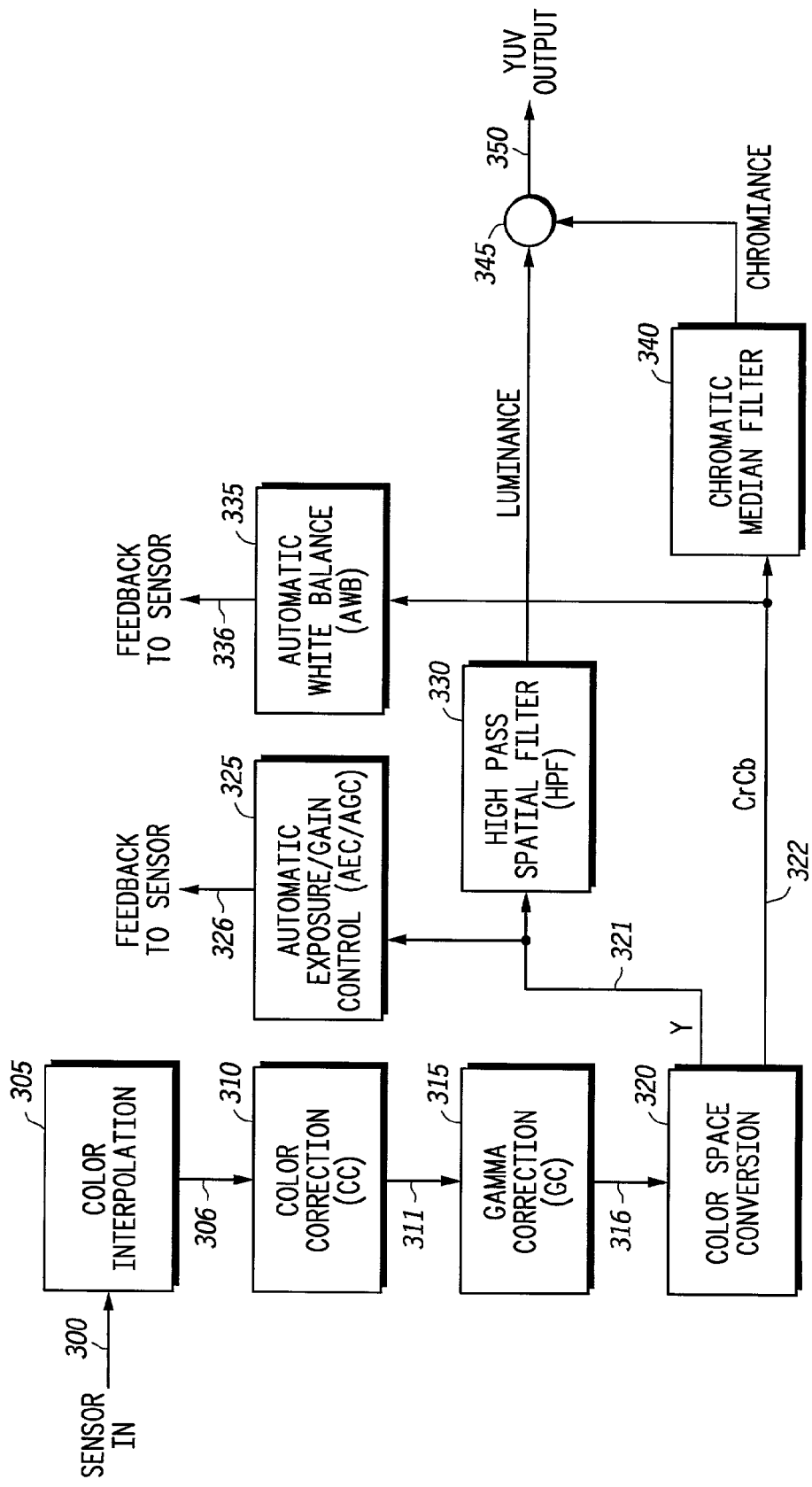
FIG. 3 shows a flow diagram of an alternative embodiment of digital color image pre-processing.

FIG. 3 shows a block diagram of an alternative digital color image pre-processing according to other embodiments of the present disclosure. A sensor signal 300 is coupled to a color interpolation block 305. The color interpolation block 305 is coupled to a color correction block 310 via a color interpolation signal 306. The color correction block 310 is coupled to a gamma correction block 315 via a color correction signal 311. The gamma correction block 315 is coupled to a color space conversion block 320 via a gamma correction signal 316.

Still referring to FIG. 3, the color space conversion block 320 is coupled to an automatic exposure and gain control block 325 and to a high-pass spatial filter block 330 via a luminance signal 321. The color space conversion block 320 is also coupled to an automatic white balance block 335 and to a chromatic medial filter block 340 via a chromiance signal 322. The automatic exposure and gain control block 325 is coupled to a sensor via a first feedback signal 326. The automatic white balance block 335 is coupled the sensor via a second feedback signal 336. The high-pass spatial filter block 330 and the chromatic median filter block 340 are coupled to a combining block 345. The combining block 345 outputs an YUV signal 350.

Still referring to FIG. 3, the sensor signal 300 can be a raw Bayer (or other CFA) sensor signal. The color interpolation block 305 can perform a three-by-three edge demosaic of a raw Bayer image to an RGB (24-bit color) image and edge enhancements. The color correction block 310 can manipulate color ratios of three color planes within each pixel, causing a spatial noise increase. The gamma correction block 315 can perform a variable gamma correction algorithm increasing a perceived dynamic range of an image.

Still referring to FIG. 3, the color space conversion block 320 can perform an RGB to YCC conversion via a per pixel operation. A color conversion algorithm can utilize the following equations, although those having skill in the art will recognize that other suitable equations may also be utilized:

$Y=0.257R+0.504G+0.098B+16.0;\ Y=[16,235]$ $C_r=0.439R-0.368G+0.071B+128.0;\ Cr=[16,240]$ $C_b=-0.148R-0.219G+0.439B+128.0;\ Cb=[16,240]$

Still referring to FIG. 3, the color conversion function can operate at over 13 Mpixels per second. The gamma correction signal 316 can be RGB 24 bit (8 bit per color), and the luminance and chromiance signals 321, 322 can be $YC_rC_b$ 4:2:2 16 bits per pixel (8 bits per value).

Still referring to FIG. 3, the automatic exposure and gain block 325 can perform a serial combination of automatic exposure and automatic gain algorithms with a first feedback signal 326 to the sensor for both algorithms, increasing an available signal-to-noise ratio by maximizing an exposure, and eliminating digital missing codes by performing the automatic gain algorithm in the analog domain on the sensor before an analog-to-digital conversion. The automatic white balance block 335 can calculate a gray model ratio of the colors in the Bayer (or other CFA) pattern and apply a constant multiplier to each color. The automatic white balance block 335 can also provide a second feedback signal 336 to the sensor to perform color gains in the analog domain.

Still referring to FIG. 3, an edge enhancement of the luminance signal 321 can be achieved with the high-pass spatial filter block 330 via a three-by-three convolution algorithm of luminance data. The high-pass spatial filter block 330 can help eliminate a field pattern noise due to chromaticity differences. A false color suppression of the chromiance signal 322 can be achieved with the chromatic median filter 340 via a three-by-three median filter algorithm, replacing a pixel of focus with a medial value of nine pixels in a three-by-three pixel area as required. The combining block 345 combines the outputs of the high-pass spatial filter block 330 and chromatic median filter block 340 into the YUV signal output 350.

Still referring to FIG. 3, the high-pass filter block 330 may perform an edge enhancement algorithm in luma space, lowering a fixed pattern noise component. The automatic exposure and gain control block 325 and the automatic white balance block 335 can provide feedback to the sensor via the first and second feedback signals 326, 336. The chromatic median filter 340 can help mitigate false colors coupled into the system through optical aliasing.

* * *

As mentioned earlier, a practical application of the invention that has value within the technological arts includes, but is not limited to, methods and/or apparatus to achieve digital color image pre-processing of a sensor image. Further, the invention is useful in conjunction with still cameras, video cameras, camcorders, advanced photo system cameras, or the like. In fact, techniques of the present disclosure may be readily applied to any system involving the need for image processing. Technique of this disclosure improve quality and/or reduce costs compared to previous approaches.

Although the digital color image pre-processing of a sensor image described herein may be included as a separate module, it will be manifest that the digital color image pre-processing of a sensor image may be integrated into any system with which it is associated. Furthermore, all the disclosed elements and features of each disclosed embodiment can be combined with, or substituted for, the disclosed elements and features of every other disclosed embodiment except where such elements or features are mutually exclusive.

The individual components described herein need not be made in the exact disclosed forms, or combined in the exact disclosed configurations, but could be provided in any suitable form, and/or combined in any suitable configuration.

It will be manifest that other various substitutions, modifications, additions and/or rearrangements of the features of the invention may be made without deviating from the spirit and/or scope of the underlying inventive concept, which is defined by the appended claims and their equivalents.

The appended claims are not to be interpreted as including means-plus-function limitations, unless such a limitation is explicitly recited in a given claim using the phrase(s) "means for" and/or "step for."

What is claimed is:

1. A method for processing an image, comprising:
   providing a sensor output;
   performing an automatic gain control of the sensor output to generate a first output,
     wherein the automatic gain control is applied in a digital domain, including
     performing an expansion of a histogram to fill a dynamic range;
   performing an automatic white balance correction to the first output to generate a second output;
   performing a gamma correction of the second output to generate a third output, wherein
     the gamma correction performs a variable gamma correction to increase a
     dynamic range of an image included in the second output;
   performing a color interpolation to the third output to generate a fourth output;
   performing a low-pass spatial filtration of the fourth output to generate a fifth output,
     wherein the low-pass spatial filtration is for eliminating a fixed pattern noise in a flat field;
   performing a color saturation and correction of the fifth output to generate a sixth output; and
   performing a high-pass spatial filtration of the sixth output to generate an image output.

2. The method of claim 1, wherein the automatic white balance correction comprises calculating a gray world model ratio of a set of colors in a pattern and applying a multiplier to each color.

3. The method of claim 1, wherein the gamma correction is performed in gray space.

4. The method of claim 1, wherein the color interpolation comprises performing a three-by-three edge enhanced demosaic of a raw Bayer signal to an RGB signal.

5. The method of claim 1, wherein the low-pass spatial filtration comprises performing a low-pass spatial filter on each of a plurality of color planes.

6. The method of claim 1, wherein the color saturation and correction comprises manipulating color ratios of a plurality of color planes within each of a plurality of pixels.

7. The method of claim 1, wherein the high-pass spatial filtration comprises enhancing a spatial edge.

8. An imaging device configured to implement the method of claim 1.

9. An application specific integrated circuit configured to implement the method of claim 1.

* * * * *